April 22, 1924.  1,491,101
W. E. HOKE
METHOD OF AND MACHINE FOR MAKING GAUGES AND OTHER ARTICLES
Filed July 8, 1919    2 Sheets-Sheet 1
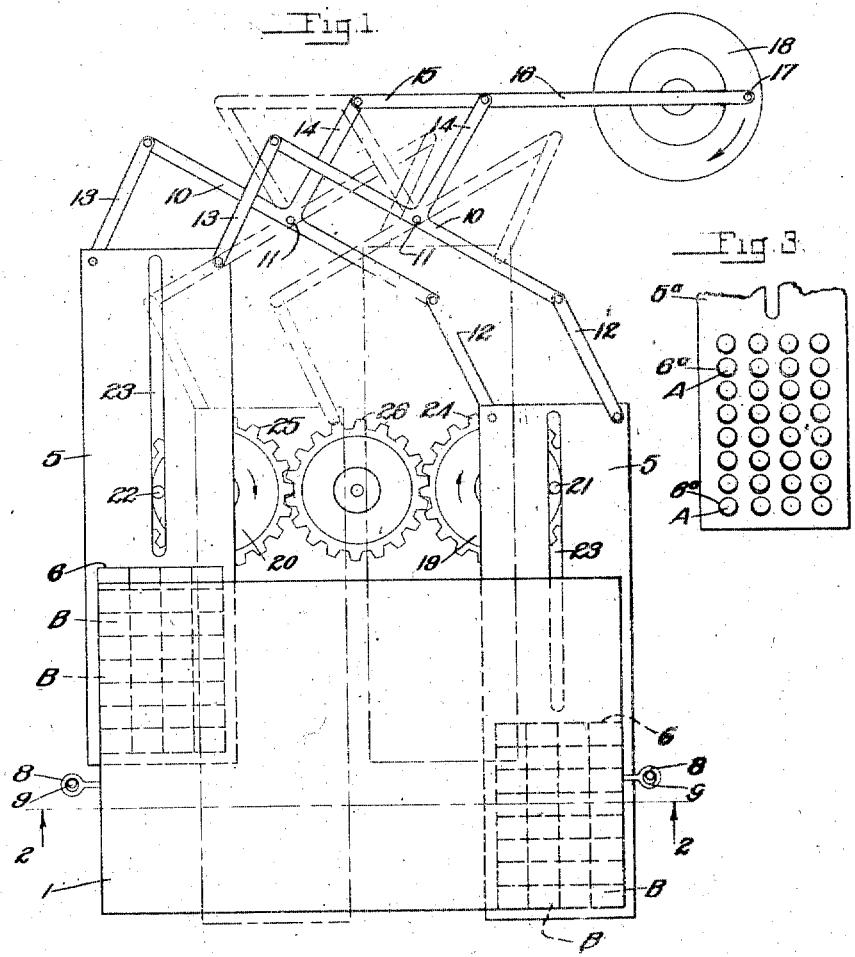
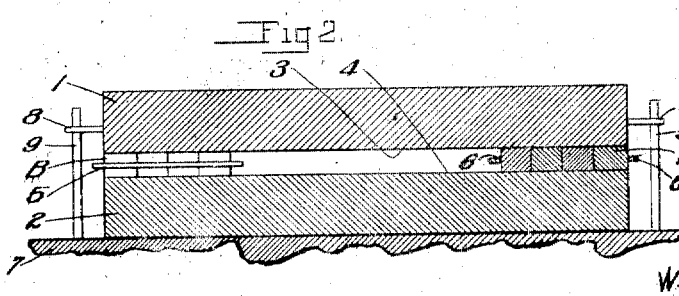
Inventor
William E. Hoke
BY S. Jay Teller
ATTORNEY April 22, 1924.                W. E. HOKE                    1,491,101
          METHOD OF AND MACHINE FOR MAKING GAUGES AND OTHER ARTICLES
                        Filed July 8, 1919        2 Sheets Sheet 2

Fig 4

| | a | b | c | d |
|---|---|---|---|---|
| 1 | | | | |
| 2 | | | | |
| 3 | | | | |
| 4 | | | | |
| 5 | | | | |
| 6 | | | | |
| 7 | | | | |
| 8 | | | | |

Fig 5

| | c | b | a | d |
|---|---|---|---|---|
| 1 | | | | |
| 2 | | | | |
| 3 | | | | |
| 4 | | | | |
| 5 | | | | |
| 6 | | | | |
| 7 | | | | |
| 8 | | | | |

Fig 6

| | a | b | c | d |
|---|---|---|---|---|
| 8 | | | | |
| 2 | | | | |
| 6 | | | | |
| 4 | | | | |
| 5 | | | | |
| 3 | | | | |
| 7 | | | | |
| 1 | | | | |

Fig 7

| a | b | c | d |
|---|---|---|---|
| 1 | 8 | 1 | 8 |
| 2 | 7 | 2 | 7 |
| 3 | 6 | 3 | 6 |
| 4 | 5 | 4 | 5 |
| 5 | 4 | 5 | 4 |
| 6 | 3 | 6 | 3 |
| 7 | 2 | 7 | 2 |
| 8 | 1 | 8 | 1 |

Fig 8

| | | | | |
|---|---|---|---|---|
| 1 | a | b | c | d |
| 2 | d | c | b | a |
| 3 | a | b | c | d |
| 4 | d | c | b | a |
| 5 | a | b | c | d |
| 6 | d | c | b | a |
| 7 | a | b | c | d |
| 8 | d | c | b | a |

Fig 9

| a | q | c | p |
|---|---|---|---|
| b | b | ɔ | d |
| a | q | c | p |
| b | b | ɔ | d |
| a | q | c | p |
| b | b | ɔ | d |
| a | q | c | p |
| b | b | ɔ | d |

Fig 10.

| | a | b | c | d |
|---|---|---|---|---|
| 1 | | | | |
| 2 | | | | |
| 3 | | | | |
| 4 | | | | |
| 5 | | | | |
| 6 | | | | |
| 7 | | | | |
| 8 | | | | |

| | e | f | g | h |
|---|---|---|---|---|
| 9 | | | | |
| 10 | | | | |
| 11 | | | | |
| 12 | | | | |
| 13 | | | | |
| 14 | | | | |
| 15 | | | | |
| 16 | | | | |

Fig 11

| | h | b | f | d |
|---|---|---|---|---|
| 1 | | | | |
| 2 | | | | |
| 3 | | | | |
| 4 | | | | |
| 5 | | | | |
| 6 | | | | |
| 7 | | | | |
| 8 | | | | |

| | e | c | g | a |
|---|---|---|---|---|
| 9 | | | | |
| 10 | | | | |
| 11 | | | | |
| 12 | | | | |
| 13 | | | | |
| 14 | | | | |
| 15 | | | | |
| 16 | | | | |

Fig 12.

| | a | b | c | d |
|---|---|---|---|---|
| 9 | | | | |
| 2 | | | | |
| 11 | | | | |
| 4 | | | | |
| 13 | | | | |
| 6 | | | | |
| 15 | | | | |
| 8 | | | | |

| | e | f | g | h |
|---|---|---|---|---|
| 1 | | | | |
| 10 | | | | |
| 3 | | | | |
| 12 | | | | |
| 5 | | | | |
| 14 | | | | |
| 7 | | | | |
| 16 | | | | |

Inventor
William E. Hoke
BY S. Jay Teller
ATTORNEY

Patented Apr. 22, 1924.

1,491,101

UNITED STATES PATENT OFFICE.

WILLIAM E. HOKE, OF ST. LOUIS, MISSOURI, ASSIGNOR TO PRATT & WHITNEY COMPANY, OF NEW YORK, N. Y., A CORPORATION OF NEW JERSEY.

METHOD OF AND MACHINE FOR MAKING GAUGES AND OTHER ARTICLES.

Application filed July 8, 1919. Serial No. 309,448.

*To all whom it may concern:*

Be it known that I, WILLIAM E. HOKE, a citizen of the United States, residing at St. Louis, Missouri, have invented certain new and useful Improvements in Methods of and Machines for Making Gauges and Other Articles, of which the following is a specification.

This invention relates to a method of lapping gauge blocks or similar articles to produce identical sizes, and particularly to produce plane parallel opposite surfaces separated from each other by an assigned dimension, with a high degree of accuracy. The method is in some respects similar to the methods set forth in my copending applications for method of making identical articles, Serial No. 252,073 filed August 30th, 1918, and for method of and machine for making gauges and other articles, Serial No. 289,591 filed April 12th, 1919. The invention further relates to a machine whereby the method may be practiced.

In the accompanying drawings I have illustrated in diagrammatic form a machine embodying the mechanical features of the invention and adapted for practicing the method. I have also presented further diagrams by which the method will be explained in detail. It will be understood that the drawings are for illustrative purposes only and are not to be construed as defining or limiting the scope of the invention, the claims appended to this specification being relied upon for that purpose.

Of the drawings:

Fig. 1 is a plan view of the machine.

Fig. 2 is a sectional view through the line 2—2 of Fig. 1.

Fig. 3 is a fragmentary view of a different form of plate that may be used for moving the blocks.

Figs. 4 to 12 are diagrammatic views further illustrating the method.

The blocks to be lapped are first formed with the desired shape and with a little more than the desired length, by any usual or preferred means. When they are to be used as gauges the blocks are hardened and otherwise suitably treated, but these preliminary steps constitute no part of the present invention. After the blocks have been thus formed and treated, they are then subjected to a lapping operation or a series of lapping operations and are otherwise acted upon, in the manner to be described.

Referring to Figs. 1 and 2 of the drawings, it will be seen that the machine includes two laps 1 and 2 of similar size and preferably rectangular in form, having their adjacent faces 3 and 4 made as nearly plane as possible in accordance with any method for producing plane surfaces. The adjacent surfaces of the two laps are suitably prepared and are charged with an abrasive such as fine emery. The character of the laps and of the abrasive may be varied as required. A number of similar blocks B—B are placed between the two laps 1 and 2, these blocks being arranged in at least one definite group, and preferably in two equal definite groups. For holding the blocks of each group in proper relationship and for other purposes, as will be presently described, there is provided a flat plate or spider 5. As shown in Figs. 1 and 2, each plate 5 has a large rectangular opening 6 which is of such size and shape as to be adapted to receive and hold the blocks of one group.

In order to cause lapping, relative movement is effected between the blocks and the laps, this movement preferably being effected by moving the blocks and holding the laps against any considerable movement. The laps are caused to contact with the blocks with a proper pressure, and while I do not so limit myself as concerns all features of the invention, this pressure is preferably secured by arranging the parts horizontally, as shown. The lower lap is held by a suitable support 7, and the weight of the upper lap is utilized to secure the desired pressure between the laps and the blocks. The upper lap is supported entirely on the blocks, and if greater pressure is desired additional weight can be applied to the upper lap. The upper lap is entirely free as concerns vertical movement and it can adjust itself as to parallelism with the lower lap in accordance with the lengths of the blocks. The lower lap is held against movement by its engagement with the support 7 and the upper lap is held against any considerable horizontal movement by any suitable means such as the two I-bolts 8, 8 engaging pins 9, 9 on the support 7.

In accordance with the present invention, the relative movement between the blocks and the laps is preferably a reciprocating one, and preferably the movement is compound, reciprocations being effected simultaneously in two directions at right angles to each other. When two equal groups of blocks are provided, as is preferred, they are so positioned with respect to the laps that the weight of the upper lap is equally divided between the two groups of blocks, and the reciprocating movements of the two groups of blocks are effected in such definite relation to each other that this equal distribution or balancing of the weight of the upper lap is always maintained. As the result of this equal distribution of the weight, I secure the same amount of pressure and hence the same amount of lapping on all of the blocks and I make it impossible for some of the blocks of one group to be reduced more rapidly than the blocks of the other group, or for the blocks at one side of a single group to be reduced more rapidly than those at the other side.

As shown in the drawings, the two plates 5, 5 are engaged by a suitable mechanism which serves to reciprocate them simultaneously in opposite directions. This mechanism may vary widely, but for purposes of illustration, I have shown two similar walking beams 10, 10 which are pivoted for movement about parallel axes at 11, 11. The walking beams are connected with the right-hand plate 5 by means of parallel motion links 12, 12 and are connected with the left-hand plate 5 by means of parallel motion links 13, 13. The two walking beams are provided with similar actuating arms 14, 14 which are connected by a link 15 and which are adapted to be oscillated by means of a connecting rod 16 engaging a pin 17 on a rotating crank disk 18. It will be seen that when the disk 18 is rotated the two walking beams will be oscillated, thus causing the two plates 5, 5 to be regularly reciprocated in opposite directions. The parallel motion links 12, 12 and 13, 13 cooperating with the walking beams serve to hold the two plates 5, 5 in parallelism during their reciprocations. It will be seen that inasmuch as the two groups of blocks move oppositely, they are always symmetrically disposed with respect to the longitudinal center line of the laps, the weight of the upper lap, therefore, being equally divided between them.

Preferably, in order that each group of blocks may engage a relatively large part of the lap surfaces, I provide for a supplemental simultaneous reciprocating movement at right angles to that before described. The mechanism for effecting this supplemental reciprocating movement may vary widely, but for purposes of illustration I have shown two crank disks 19 and 20 which respectively carry pins 21 and 22 entering longitudinal slots 23, 23 in the respective plates 5, 5. The two crank disks 19 and 20 are connected together for synchronous rotation, as for instance by means of gears 24, 25 and 26. When the disks are rotated the plates 5, 5 are oppositely reciprocated toward and from the transverse center line of the laps. The lengths of the slots 23 are such that this longitudinal reciprocating movement does not interfere in any way with the transverse reciprocating movement. Inasmuch as the longitudinal reciprocating movements of the two groups of blocks are equal, they are at all times symmetrically disposed with respect to the transverse center line of the laps, and the weight of the upper lap remains equally divided between the two groups for all purposes thereof.

As shown in Figs. 1 and 2, each plate 5 is provided with a large opening 6 which substantially fits the group of blocks B—B to be lapped. As shown, the blocks are rectangular and the group consists of intersecting rows. I do not, however, limit myself as to the shape of the blocks or the exact arrangement. Under some circumstances it may be preferable to provide somewhat different plates, as shown in Fig. 3. This figure shows a plate 5ª having a number of small circular apertures 6ª, each adapted to receive a single block. As illustrated, each aperture 6ª is somewhat larger than the block so as to permit the block to turn or roll slowly as the plate moves in different directions. I have shown blocks A—A which are circular, but it will be understood that I am not limited to circular blocks.

In accordance with my method, the machine as shown is operated for a reasonable time, preferably until all of the blocks have been lapped and until the laps engage all of them equally. Then the movement is stopped and one lap, ordinarily the upper lap, is removed, thus leaving the blocks exposed. Certain blocks are then transferred in such a way as to distribute any errors or variations in the respective lengths. It may be assumed that with a group of blocks of slightly varying lengths those at one part of the group will average longer than those at another part. Similarly, when two similar groups are provided, it may be assumed that those of one group will average longer than those of the other. Following this assumption it will be seen that the transferring must be such that the longer and shorter blocks will be commingled, preferably one or more of the longer blocks being positioned between two or more of the shorter blocks. In order that the longer and shorter blocks may be uniformly distributed, the transferring is preferably effected symmetrically.

The blocks of any one group may be transferred or moved about in a variety of ways, as will be understood from Figs. 4 to 9 which illustrate typical ways of transferring. Fig. 4 can be considered to represent the initial arrangement of the blocks of a group. The blocks can be positioned all in one large opening in the plate, as shown in Figs. 1 and 2, or in individual apertures, as shown in Fig. 3. As illustrated in Fig. 4, there are four longitudinal rows of blocks designated a—b—c—d and eight transverse rows designated 1—2—3—4—5—6—7—8. As illustrated in Fig. 5, two of the longitudinal rows, as for instance a and c, have been interchanged. As illustrated in Fig. 6, alternate transverse rows have been interchanged, as for instance 1 and 8 and 3 and 6. As illustrated in Fig. 7, alternate longitudinal rows, as for instance b and d have been reversed end for end. As illustrated in Fig. 8, alternate transverse rows, as for instance 2, 4, 6 and 8, have been reversed end for end. As illustrated in Fig. 9, alternate individual blocks have been turned through 180°. It will be clear that the blocks may be transferred in other ways, particularly in combinations of the ways illustrated. Furthermore, it may under certain conditions be desirable to turn some of the blocks over.

It will be seen that the transferring or transposing of the blocks in the ways described serves to equally distribute any errors or variations in length. If the blocks at one side are longer than those at the other side, or if the blocks at one end are longer than those at the other end, the several transpositions or changes will place the longer blocks between the shorter blocks in alternate relationship.

Preferably when two groups of blocks are provided as illustrated, transferring or transposing is effected not only within each group but also between the two groups. Fig. 10 can be considered to represent the initial arrangement of the blocks of the two groups. As illustrated, there are four longitudinal rows of blocks in each group designated a—b—c—d and e—f—g—h respectively. There are eight transverse rows of blocks in each group designated 1—2—3—4—5—6—7—8 and 9—10—11—12—13—14—15—16 respectively. As illustrated in Fig. 11, two longitudinal rows of each group have been interchanged as for instance a and h and c and f. As illustrated in Fig. 12, alternate transverse rows of each group have been interchanged, as for instance 1 and 9, 3 and 11, 5 and 13 and 7 and 15. It will be clear that transposition can be effected in ways additional to those shown.

The blocks having been transferred as described, the top lap is restored to position and the lapping operation is repeated. Obviously the laps will at first engage only the longer blocks, thus reducing their lengths. The lapping operation is continued preferably until the laps again engage all of the blocks. Obviously the blocks are more nearly uniform in length than before, but there may still be some variation. Therefore transferring is again effected as before described, the manner thereof being varied, and the blocks are again lapped. These operations are repeated alternately in succession for a number of times and the final result is that all of the blocks have exactly the same length and have their end surfaces exactly flat and parallel.

The blocks having been made with identical lengths and with plane parallel end surfaces, the lapping operation is then continued to reduce the lengths to the desired predetermined amount. If considerable additional lapping is required to secure the desired uniform length, it may be preferable to continue the transferring of the blocks from time to time to avoid possible variations. The blocks may be measured in any desired way to ascertain when the predetermined lengths have been reached. Use may be made of the method of measurement set forth in my aforesaid application Serial No. 289,591, but this method constitutes no part of my present invention and need not be here described.

What I claim is:

1. The method of reducing a number of similar blocks to produce parallel flat end faces and identical lengths, which consists in arranging the several blocks in a definite group between two opposed flat laps held against any considerable relative movement, permitting the laps to adjust themselves as to parallelism in accordance with the lengths of the blocks, and causing relative reciprocation between the group of blocks and the laps to effect lapping.

2 The method of reducing a number of similar blocks to produce parallel flat end faces and identical lengths, which consists in arranging the several blocks against any considerable relative movement, permitting the laps to adjust themselves as to parallelism in accordance with the lengths of the blocks, causing relative reciprocation between the group of blocks and the laps to effect lapping, and also simultaneously causing relative reciprocation at a different rate between the group of blocks and the lap in a direction perpendicular to the direction of the first said reciprocation.

3. The method of reducing a number of similar blocks to produce parallel flat end faces and identical lengths, which consists in arranging the several blocks in two equal definite groups between two opposed horizontal flat laps, permitting the upper lap to adjust itself with respect to the lower lap in accordance with the lengths of the blocks, and causing such movement of the two groups of blocks with respect to the laps that the weight of the upper lap is always equally divided between the two groups of blocks.

4. The method of reducing a number of similar blocks to produce parallel flat end faces and identical lengths, which consists in arranging the several blocks in two equal definite groups between two opposed horizontal flat laps, permitting the upper lap to adjust itself with respect to the lower lap in accordance with the lengths of the blocks, and oppositely reciprocating the two groups of blocks with respect to the laps so that the weight of the upper lap is always equally divided between the two groups of blocks.

5. The method of reducing a number of similar blocks to produce parallel flat end faces and identical lengths, which consists in arranging the several blocks in two equal definite groups between two opposed horizontal flat laps, permitting the upper lap to adjust itself with respect to the lower lap in accordance with the lengths of the blocks, reciprocating the two groups of blocks with respect to the laps parallelly with a center line thereof, and simultaneously reciprocating the two groups of blocks with respect to the laps perpendicularly to the said center line at a different rate, the reciprocating movements of the two groups in each direction being equal and opposite so that the weight of the upper lap is always equally divided between the two groups of blocks.

6. The method of reducing a number of similar blocks to produce parallel flat end faces and identical lengths, which consists in arranging the several blocks in a definite group between two opposed flat laps held against any considerable relative movement, permitting the upper lap to adjust itself with respect to the lower lap in accordance with the lengths of the blocks, causing relative reciprocation between the group of blocks and the lap to effect lapping, transferring some of the blocks to distribute variations in length, and repeating the lapping and transferring operations alternately until identical lengths are obtained.

7. The method of reducing a number of similar blocks to produce parallel flat end faces and identical lengths, which consists in arranging the several blocks in a definite group between two opposed flat laps held against any considerable relative movement, the said group comprising a plurality of parallel rows, permitting the upper lap to adjust itself with respect to the lower lap in accordance with the lengths of the blocks, causing relative reciprocation between the group of blocks and the lap to effect lapping, interchanging some of the rows of blocks to distribute variations in length, and repeating the lapping operation.

8. The method of reducing a number of similar blocks to produce parallel flat end faces and identical lengths, which consists in arranging the several blocks in a definite group between two opposed flat laps held against any considerable relative movement, the said group comprising a plurality of intersecting rows, permitting the upper lap to adjust itself with respect to the lower lap in accordance with the lengths of the blocks, causing relative reciprocation between the group of blocks and the lap to effect lapping, interchanging some of the rows extending in one direction to distribute variations in length, interchanging some of the rows extending in the other direction to further distribute variations in length, and repeating the lapping operation after each interchanging.

9. The method of reducing a number of similar blocks to produce parallel flat end faces and identical lengths, which consists in arranging the several blocks in a definite group between two opposed flat laps held against any considerable relative movement, the said group comprising a plurality of parallel rows, permitting the upper lap to adjust itself with respect to the lower lap in accordance with the lengths of the blocks, causing relative reciprocation between the group of blocks and the lap to effect lapping, reversing some of the rows of blocks to distribute variations in length, and repeating the lapping operation.

10. The method of reducing a number of similar blocks to produce parallel flat end faces and identical lengths, which consists in arranging the several blocks in a definite group between two opposed flat laps held against any considerable relative movement, the said group comprising a plurality of parallel rows, permitting the upper lap to adjust itself with respect to the lower lap in accordance with the lengths of the blocks, causing relative reciprocation between the group of blocks and the lap to effect lapping, reversing alternate blocks to distribute variations in length, and repeating the lapping operation.

11. The method of reducing a number of similar blocks to produce parallel flat end faces and identical lengths, which consists in arranging the several blocks in two equal definite groups between two opposed flat laps, permitting the laps to adjust themselves as to parallelism in accordance with the lengths of the blocks, moving the two groups of blocks with respect to the laps in different directions to effect lapping, interchanging some of the blocks of one group with some of the blocks of the other group to distribute variations in length, and repeating the lapping operation.

12. The method of reducing a number of similar blocks to produce parallel flat end faces and identical lengths, which consists in arranging the several blocks in two equal definite groups between two opposed flat laps, each group comprising a plurality of parallel rows, permitting the laps to adjust themeselves as to parallelism in accordance with the lengths of the blocks, moving the two groups of blocks with respect to the laps in different directions to effect lapping, interchanging some of the rows of blocks of one group with some of the rows of blocks of the other group to distribute variations in length, and repeating the lapping operation.

13. The method of reducing a number of similar blocks to produce parallel flat end faces and identical lengths, which consists in arranging the several blocks in a plurality of equal definite groups between two opposed horizontal flat laps permitting the upper lap to adjust itself with respect to the lower lap in accordance with the lengths of the blocks, and reciprocating the said groups of blocks with respect to the laps so that the weight of the upper lap is always equally divided among the said groups of blocks.

14. The method of reducing a number of similar blocks to produce parallel flat end faces and identical lengths, which consists in arranging the several blocks in two equal definite groups between two opposed horizontal flat laps, permitting the upper lap to adjust itself with respect to the lower lap in accordance with the lengths of the blocks, oppositely reciprocating the two groups of blocks with respect to the laps so that the weight of the upper lap is always equally divided between the two groups of blocks, interchanging some of the blocks of one group with some of the blocks of the other group to distribute variations in length, and repeating the lapping operation.

15. The method of reducing a number of similar blocks to produce parallel flat end surfaces and identical lengths, which consists in arranging the several blocks in two equal definite groups between two opposed flat laps, permitting the laps to adjust themselves as to parallelism in accordance with the lengths of the blocks, moving the two groups of blocks with respect to the laps in different directions to effect lapping, transferring some of the blocks within each group to distribute variations in length, interchanging some of the blocks of one group with some of the blocks of the other group to further distribute variations in length, and repeating the lapping operation after each transferring and interchanging.

16. A lapping machine including in combination, two opposed horizontal laps having flat working surfaces, the upper lap being freely movable vertically, two similar plates positioned between the laps and having openings therein for blocks to be lapped, the said plates being symmetrically located with respect to the upper lap so that the weight of the latter will be equally divided among the blocks engaged by the respective plates, and means for reciprocating the two plates oppositely so that they remain symmetrically disposed with respect to the upper lap, whereby the weight of the said lap remains equally divided between the blocks as aforesaid.

17. A lapping machine including in combination, two opposed horizontal laps having flat working surfaces, the upper lap being freely movable vertically, two similar plates positioned between the laps and having openings therein for blocks to be lapped, the said plates being symmetrically located with respect to the upper lap so that the weight of the latter will be equally divided among the blocks engaged by the respective plates, means for reciprocating the two plates oppositely so that they remain symmetrically disposed with respect to the upper lap, and means for simultaneously reciprocating the two plates oppositely in a direction perpendicular to the direction of the first said reciprocation so that they remain symmetrically disposed with respect to the center line perpendicular to the first said center line.

In testimony whereof, I hereto affix my signature.

WILLIAM E. HOKE.